United States Patent
Labuwy et al.

(10) Patent No.: US 8,267,478 B2
(45) Date of Patent: Sep. 18, 2012

(54) VEHICLE SEAT AND ASSEMBLY METHOD

(75) Inventors: Cornel Labuwy, Remscheid (DE);
Michael Moog, Solingen (DE); Ludger Muhlenbrock, Recklinghausen (DE);
Martin Zynda, Burscheid (DE);
Ernst-Jurgen Hake, Radevormwald (DE); Erik Sprenger, Wernelskirchen (DE)

(73) Assignee: Johnson Controls Technology Company, Holland, MI (US)

( * ) Notice: Subject to any disclaimer, the term of this patent is extended or adjusted under 35 U.S.C. 154(b) by 316 days.

(21) Appl. No.: 12/524,555

(22) PCT Filed: Feb. 12, 2008

(86) PCT No.: PCT/EP2008/001056
§ 371 (c)(1),
(2), (4) Date: Jul. 24, 2009

(87) PCT Pub. No.: WO2008/101618
PCT Pub. Date: Aug. 28, 2008

(65) Prior Publication Data
US 2010/0102613 A1 Apr. 29, 2010

(30) Foreign Application Priority Data

Feb. 19, 2007 (DE) .................. 10 2007 008 453
Sep. 6, 2007 (DE) .................. 10 2007 042 285

(51) Int. Cl.
*A47C 7/00* (2006.01)
(52) U.S. Cl. ........... 297/440.15; 297/440.1; 297/440.16; 297/440.2; 297/354.1; 297/378.12
(58) Field of Classification Search ............... 297/440.1, 297/440.15, 440.17, 440.2, 440.16, 353, 297/354.1, 378.1
See application file for complete search history.

(56) References Cited

U.S. PATENT DOCUMENTS

| | | | | |
|---|---|---|---|---|
| 5,007,680 | A * | 4/1991 | Miyauchi et al. | 297/378.12 |
| 5,064,246 | A * | 11/1991 | Pipon et al. | 297/440.15 |
| 5,240,309 | A * | 8/1993 | Kojer | 297/378.12 |
| 5,671,974 | A * | 9/1997 | Boycott et al. | 297/440.2 |
| 5,795,024 | A * | 8/1998 | Collins et al. | 297/361.1 |
| 5,826,944 | A * | 10/1998 | Beneker et al. | 297/440.2 |
| 6,030,044 | A * | 2/2000 | Kosugi et al. | 297/440.16 |
| 6,322,148 | B1 * | 11/2001 | Kolena et al. | 297/452.2 |
| 6,488,339 | B1 * | 12/2002 | Finner et al. | 297/440.16 |
| 6,543,855 | B2 * | 4/2003 | Bruck | 297/440.21 |
| 7,832,806 | B2 * | 11/2010 | Yamada | 297/440.15 |
| 2007/0029860 | A1 | 2/2007 | Yamada | |

FOREIGN PATENT DOCUMENTS

| | | |
|---|---|---|
| DE | 4423912 | 1/1996 |
| DE | 10047770 | 4/2002 |
| DE | 19942976 A | 2/2007 |
| EP | 1193119 A1 | 4/2002 |
| EP | 1749692 A2 | 2/2007 |
| FR | 2842476 A | 1/2004 |

* cited by examiner

*Primary Examiner* — Laurie Cranmer
(74) *Attorney, Agent, or Firm* — Fletcher Yoder P.C.

(57) ABSTRACT

A vehicle seat includes a backrest connected to a sitting part by a backrest adjustment element. The adjustment element has a part that is connected to the backrest or to the sitting part. At least one means is formed, incorporated, shaped and/or arranged in the backrest, in the part and/or the seat part for securing the position of the part relative to the backrest and/or to the sitting part in at least one direction.

6 Claims, 10 Drawing Sheets

VEHICLE SEAT AND ASSEMBLY METHOD

CROSS REFERENCE TO RELATED APPLICATIONS

This application claims priority from and the benefit of PCT Application No. PCT/EP2008/001056, filed on Feb. 12, 2008; German Patent No. DE 10 2007 008 453.8, filed on Feb. 19, 2007; and German Patent DE 10 2007 042 285.9, filed on Sep. 6, 2007; all entitled "Vehicle Seat and Assembly Method", which are herein incorporated by reference.

BACKGROUND

The invention relates to a vehicle seat comprising a backrest, which is connected to a sitting part by means of a backrest adjusting element, the backrest adjusting element having a part that is connected to the backrest or to the sitting part.

Such vehicle seats are known from the prior art, for example from U.S. Pat. No. 5,064,246, DE 100 47 770 and DE 44 23 912. In these vehicle seats, the backrest is connected by means of a backrest adjusting element to a sitting part, the backrest adjusting element having a part that is connected to the backrest or to the sitting part. When assembling the backrest and the sitting part of a vehicle seat, said backrest and said sitting part have to be held in an assembly position, which permits the attachment of fastening means, for example screws or spot welds. Moreover, the fastening means have to be positioned and fixed manually by means of a tool. Thus at least three objects: the backrest, the fastening means and the tool have to be held simultaneously in position, so that in practice the assembly is not able to be carried out by one person.

It was, therefore, the object of the present invention to provide a vehicle seat and a method by which vehicle seats may be assembled easily and cost-effectively.

SUMMARY

The object is achieved by a vehicle seat as claimed in the claims.

The vehicle seat according to the invention and/or the method according to the invention have the advantage that the positioning of the backrest relative to the sitting part is isolated from the attachment of the fastening means. To this end, a means is provided by which, for example, the backrest adjusting element and thus the backrest may be temporarily connected to the sitting part. As soon as the temporary connection has been made, the actual connection between the backrest or the sitting part with the backrest adjusting element is able to take place by means of corresponding fastening means. In a preferred embodiment, a connection is provided by means of which the backrest may be positioned on the sitting part, at least approximately following the direction of gravity, until reaching an end stop, the backrest being held in position by a positive connection in all directions except for the direction opposing the direction of gravity. Subsequently, the attachment of fastening means (screws, rivets or the like) or even welding may take place. The connection is preferably made between the fitting part of the backrest inclination adjuster on the sitting part side and the structure of the sitting part, the backrest inclination adjuster having been previously fastened to the structure of the backrest. In principle, naturally the sitting part may also be positioned on the backrest with the pre-assembled backrest inclination adjuster.

The vehicle seat may be any seat inside a vehicle. Said vehicle seat may provide space for one or more people, so that the vehicle seat may also be a seat bench. Said vehicle seat preferably has on its right and left side one respective backrest adjusting element, which connects the backrest to the sitting part and permits an adjustment of the inclination of the backrest relative to the sitting part. The seat adjuster, in turn, has at least one part which is connected to the backrest or to the sitting part. Preferably, however, the seat adjuster has two respective parts, one part being connected to the backrest and the other part to the sitting part.

According to the invention, at least one means is formed, incorporated, shaped or arranged in said part, the supporting structure of the backrest and/or the supporting structure of the sitting part, which preferably temporarily secures the position of the part relative to the backrest and/or to the sitting part in at least one direction. Within the meaning of the invention, "formed" means that the means is incorporated into the part, the supporting structure of the backrest and/or the supporting structure of the sitting part by reshaping. Preferably, the means are an indentation or bulged portion. Within the meaning of the invention "arranged" means that the means is attached by a positive, non-positive and/or material connection to the part, the supporting structure of the backrest and/or the supporting structure of the sitting part. The means, however, may also be a recess, for example a bore. Particularly preferably, both the part and the supporting structure of the backrest and/or the supporting structure of the sitting part have at least one of these means. Particularly preferably, the means are designed to be complementary to one another in shape and respectively arranged such that the part adopts the desired position relative to the supporting structure of the backrest and/or the supporting structure of the sitting part, in which it is subsequently fixed by the fastening means. Preferably, the means is a positive connection means, so that the connection thus created has at least one further degree of freedom.

Preferably, the part, the supporting structure of the backrest and/or the supporting structure of the sitting part comprise two means. By means of said second means, in particular, it is achieved that, if required, the connection has a further degree of freedom against gravity.

Particularly preferably, the second means is a stop.

Preferably, the means is a latching lug which is particularly preferably notched out from the backrest part or a fitting part, i.e. is integral therewith. Preferably, the latching lug is bent such that it is arranged at least slightly spaced apart from the part surrounding said latching lug.

Preferably, the latching lug cooperates with a contour which is arranged on the part which is intended to be temporarily fixed.

Preferably, the part is arranged in a pretensioned manner on the backrest or on the sitting part. As a result, it is ensured that the connection between the part and the backrest and/or the sitting part is not automatically released. This pretensioning is, for example, achieved by the parts of the right and left seat adjuster being bent apart from one another during assembly.

Particularly preferably, the means is part of a snap connection, the snap action preferably being achieved by the above-mentioned pretensioning.

After the part has been temporarily attached to the backrest or to the sitting part, it is subsequently connected to the backrest or to the sitting part by fastening means using a non-positive and/or material connection. Fastening means using a non-positive and/or material connection are, for example, screws, rivets, welded connections or adhesive connections.

In a further preferred embodiment, the means is at least one, preferably two, latching lugs which are preferably pushed out, i.e. are bent outwards, from the sitting part and/or the recliner plate. This latching lug cooperates with a contour arranged on the opposing part and positions said contour so that fastening means may be subsequently arranged. Preferably, the latching lugs cooperate in a pretensioned manner with the opposing part, which makes inadvertent release of the pre-assembly difficult.

A further subject of the present invention is a method for assembling a motor vehicle seat in which a backrest is connected to a sitting part by means of two backrest adjusting elements, each backrest adjusting element and/or each sitting part having a part that is connected to the backrest or to the sitting part, in which the parts are pretensioned and means which are formed, shaped, incorporated or arranged in the part, the backrest and/or the sitting part which engage with one another.

All embodiments provided for the vehicle seat according to the invention apply equally to the method according to the invention.

Preferably, the part is rotated around the engaged means until it bears against a stop.

Preferably, the part is subsequently non-positively and/or positively connected to the backrest and/or the sitting part.

DRAWINGS

The figures show an embodiment of the invention by way of example and schematically. These drawings are given merely by way of example and do not restrict the general inventive idea. In the drawings.

DETAILED DESCRIPTION

Figures 1A, 1B, 1C:
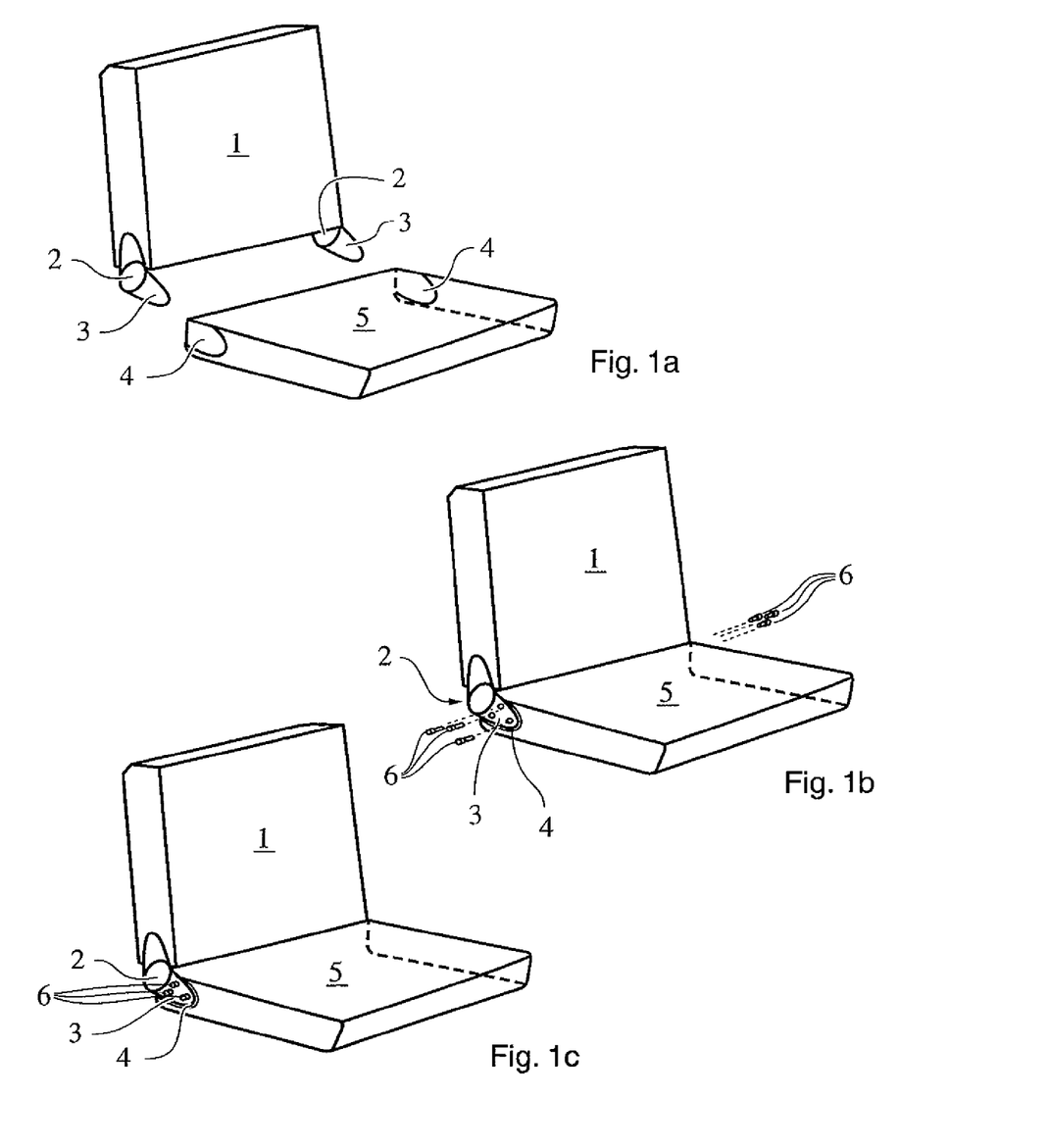
FIG. 1a-1c show the motor vehicle seat according to the invention.

FIG. 1a shows the backrest 1 comprising two backrest inclination adjusters 2 fastened thereto, the fitting parts 3 on the sitting part side being configured to be adapted to receivers 4 in the sitting part 5. After inserting or positioning the fitting parts 3 in and/or on the receivers 4, the backrest 1 remains in an upright position (FIG. 1b) without the factory worker holding said backrest. The fastening means 6, in this case screws, may now be inserted by means of a tool, not shown, successively manually through the fitting parts 3 into the sitting part 5 and permanently secure the backrest 1 to the sitting part 5 (FIG. 1c). Advantageously, the fitting parts 3 are elastically forced apart during assembly and preferably remain pretensioned, even after they come into contact with the receiver, in order to avoid that the temporary connection between the fitting part 3 and the receiver 4 is automatically released.

Figure 2:
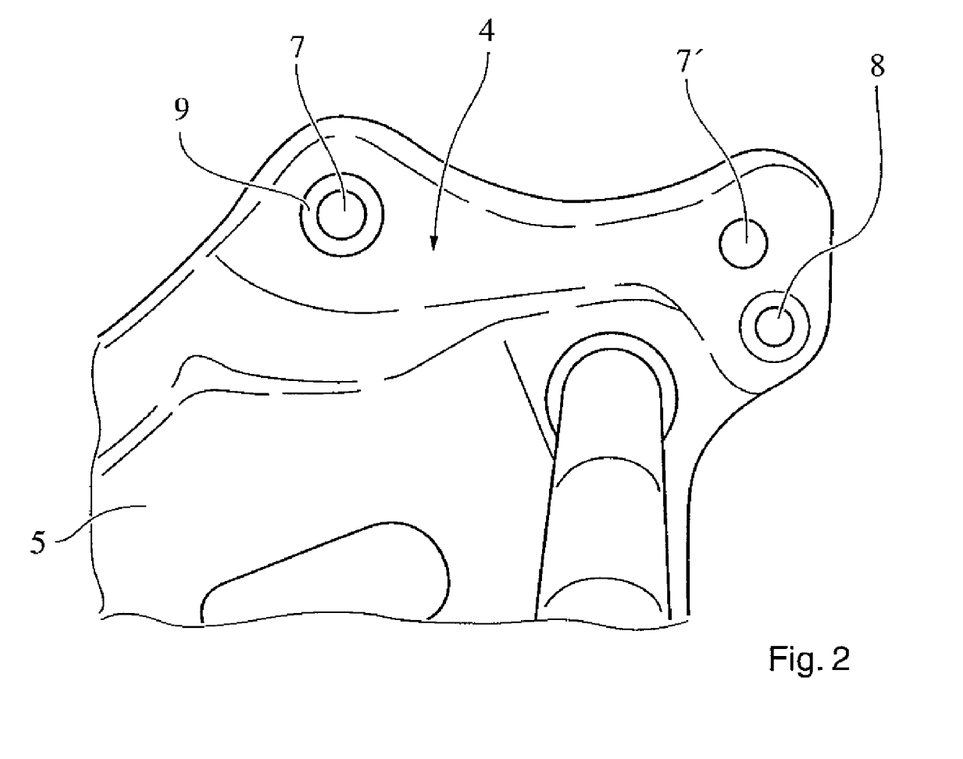
FIG. 2 shows the receiver of the seat side part.

Shown in detail in FIG. 2 is the receiver 4 of the sitting part 5, which comprises two bores 7, 7' for passing through the fastening means and a rear, raised end stop 8. The front bore 7 is provided with a cup-like concentric recess 9, which has also been produced by reshaping.

Figure 3:
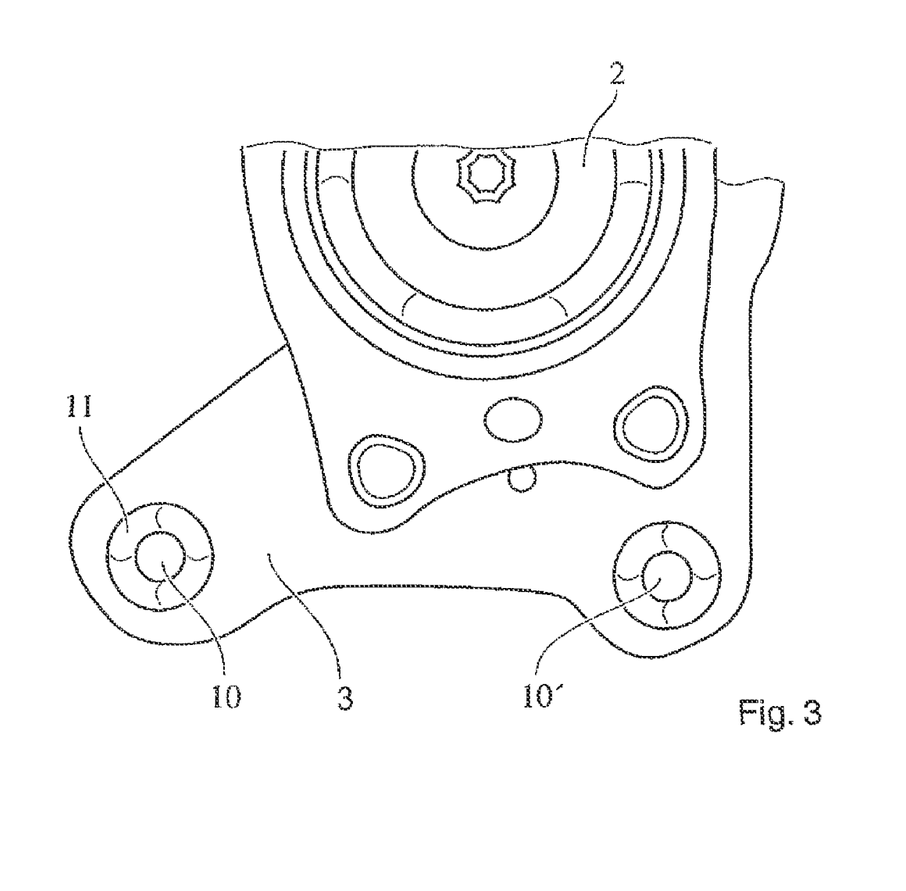
FIG. 3 shows the part of the backrest inclination adjuster which cooperates with the receiver according to FIG. 2.

The fitting part 3 of the backrest inclination adjuster 2 shown in FIG. 3 has bores 10, 10, which are designed to be at the same spacing as the bores 7, 7' in FIG. 2. The bore 10 covered by the bore 7 has a cylindrically formed convexity 11 which fits into the recess 9; i.e. is complementary thereto.

When positioning the backrest 1, the fitting parts 4 of the backrest inclination adjuster 2, which are arranged opposite one another and designed in a mirror-inverted manner, are spread apart elastically, until the convexities 11 of both backrest inclination adjusters 2 snap into the associated recesses 9 on both sides of the sitting part 5. The fitting parts 3 preferably remain at least slightly pretensioned, even after being snapped in. As a result, a positive connection is produced, with a further degree of freedom. The backrest 1 is now pivoted to the rear, as a result of gravity, until the fitting parts 4 bear against the end stops 8 on both sides of the sitting part 5. The backrest 1 now remains in this assembled position, until the fastening means 6, in this case screws, are guided through the bores 7, 10 and/or 7', 10' and tightened.

Figure 4A:
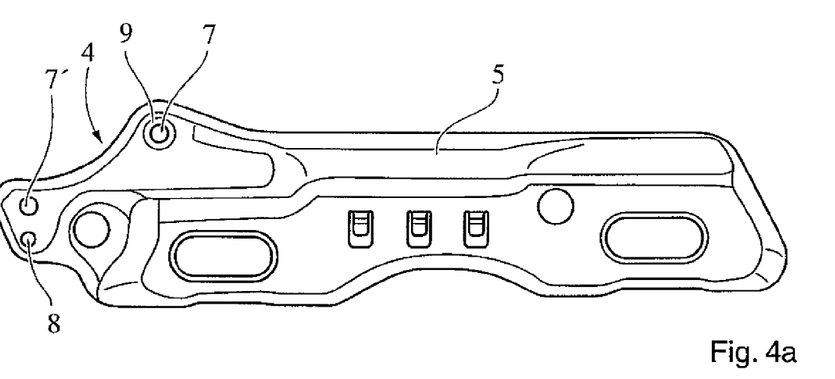
FIG. 4a-4b show details of the side parts of the sitting part.
Figure 4B:
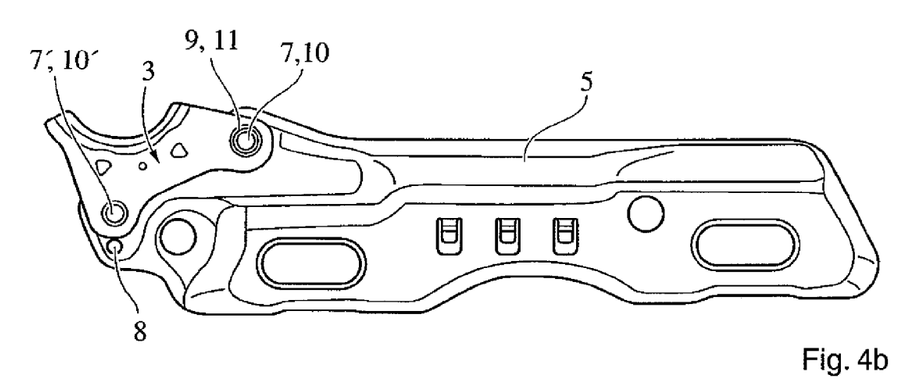
Figure 5A:
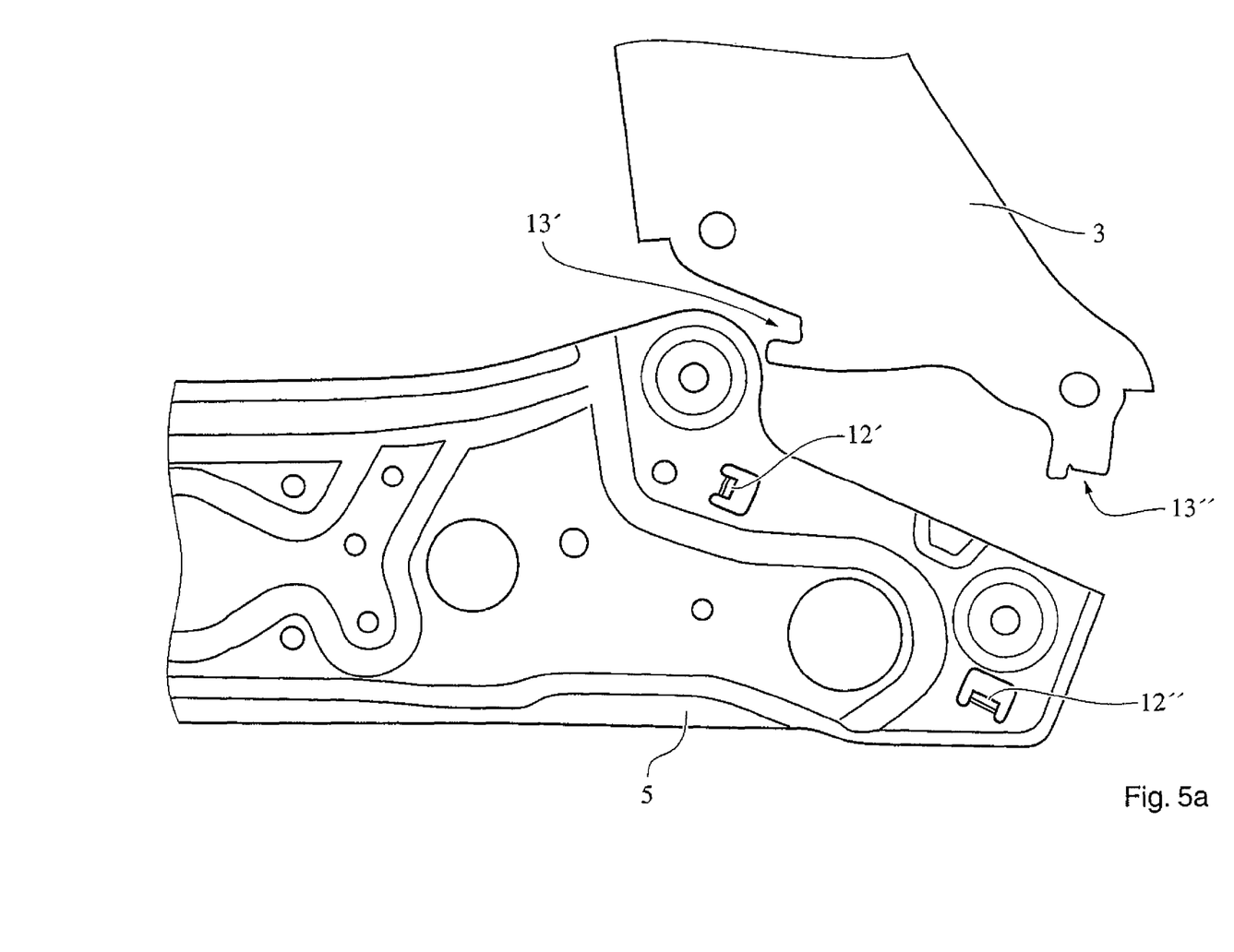
FIG. 5a-5f show a further possibility for pre-fixing a fitting part to the sitting part.
Figure 5B:
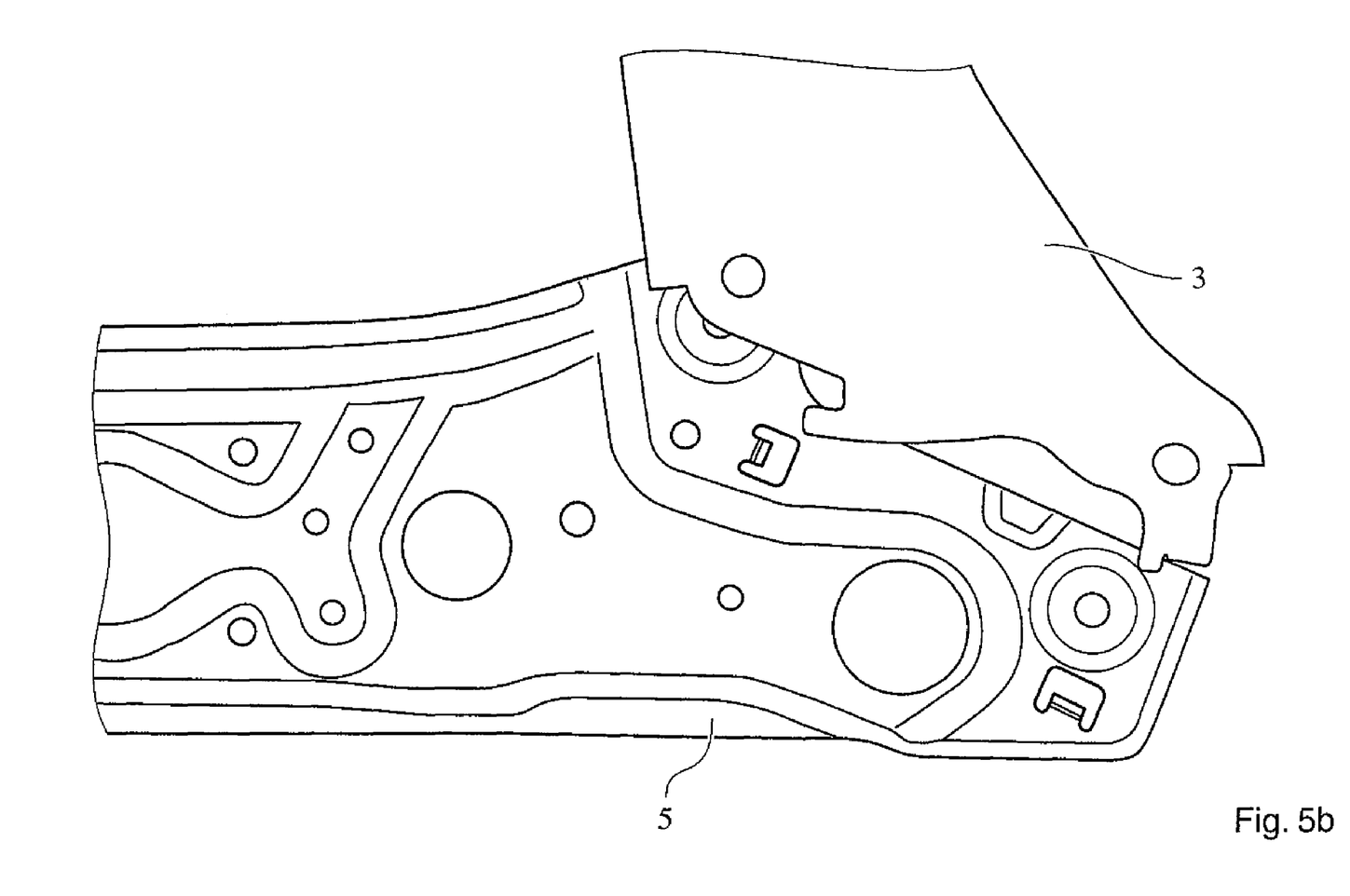
Figure 5C:
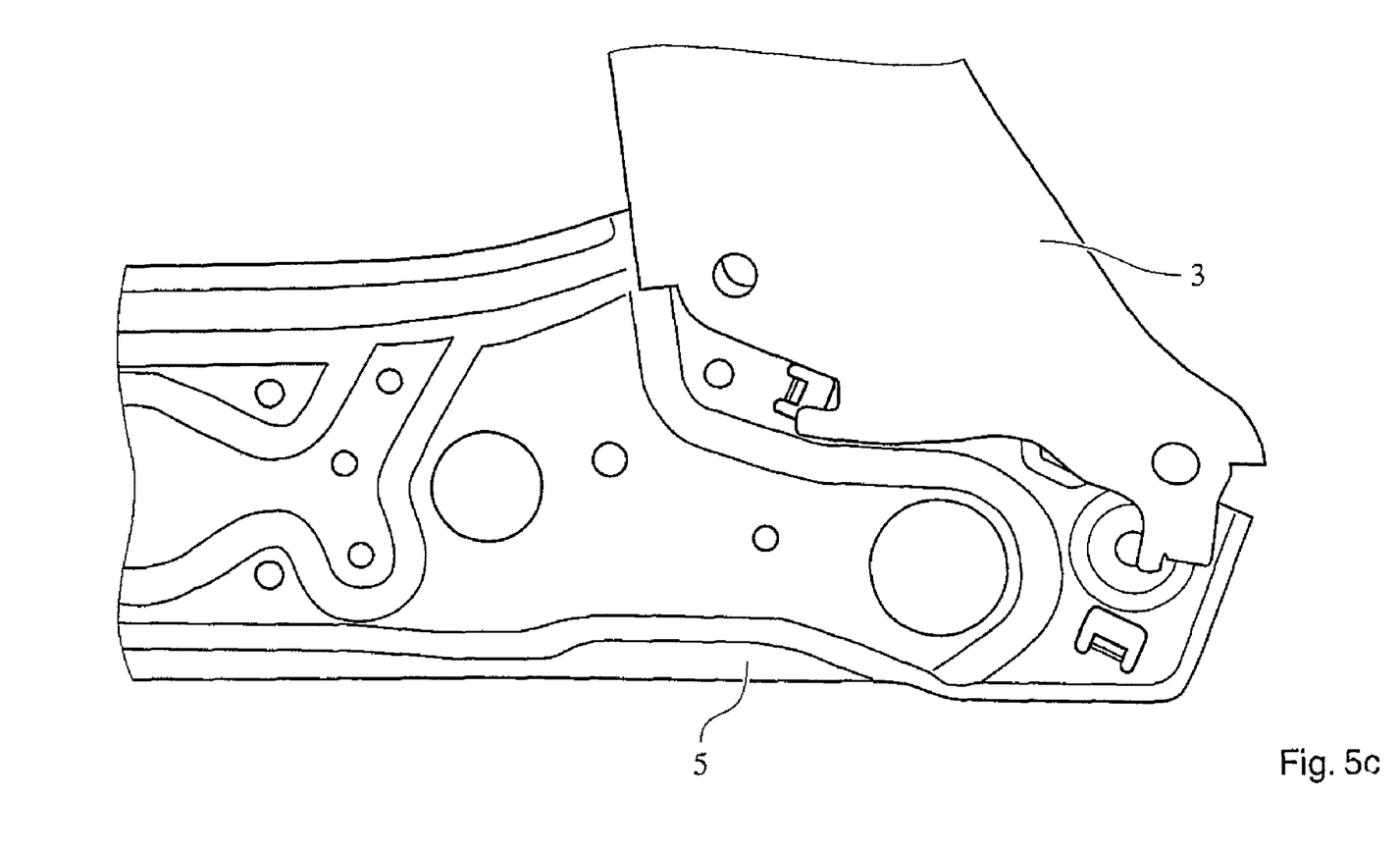
Figure 5D:
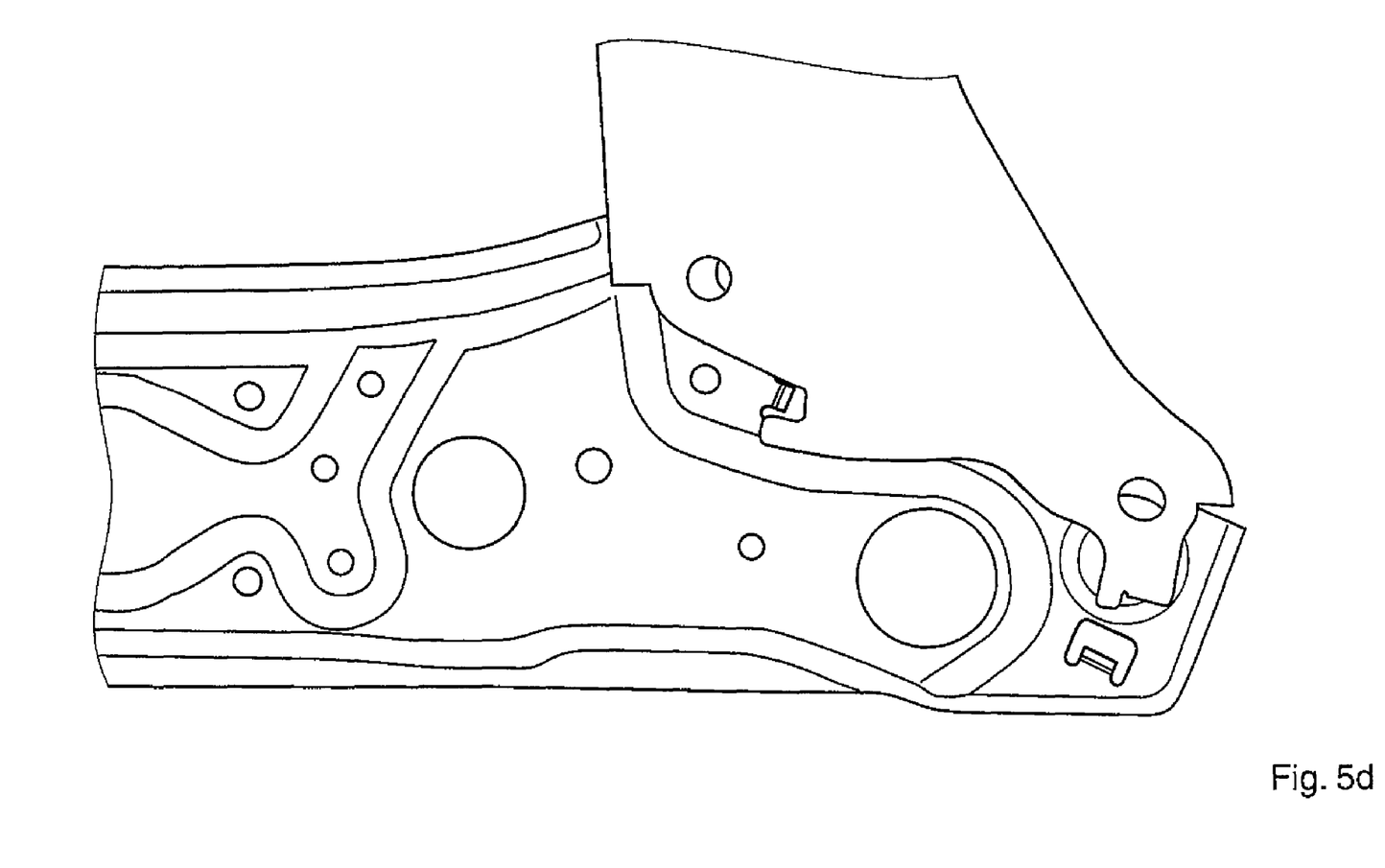
Figure 5E:
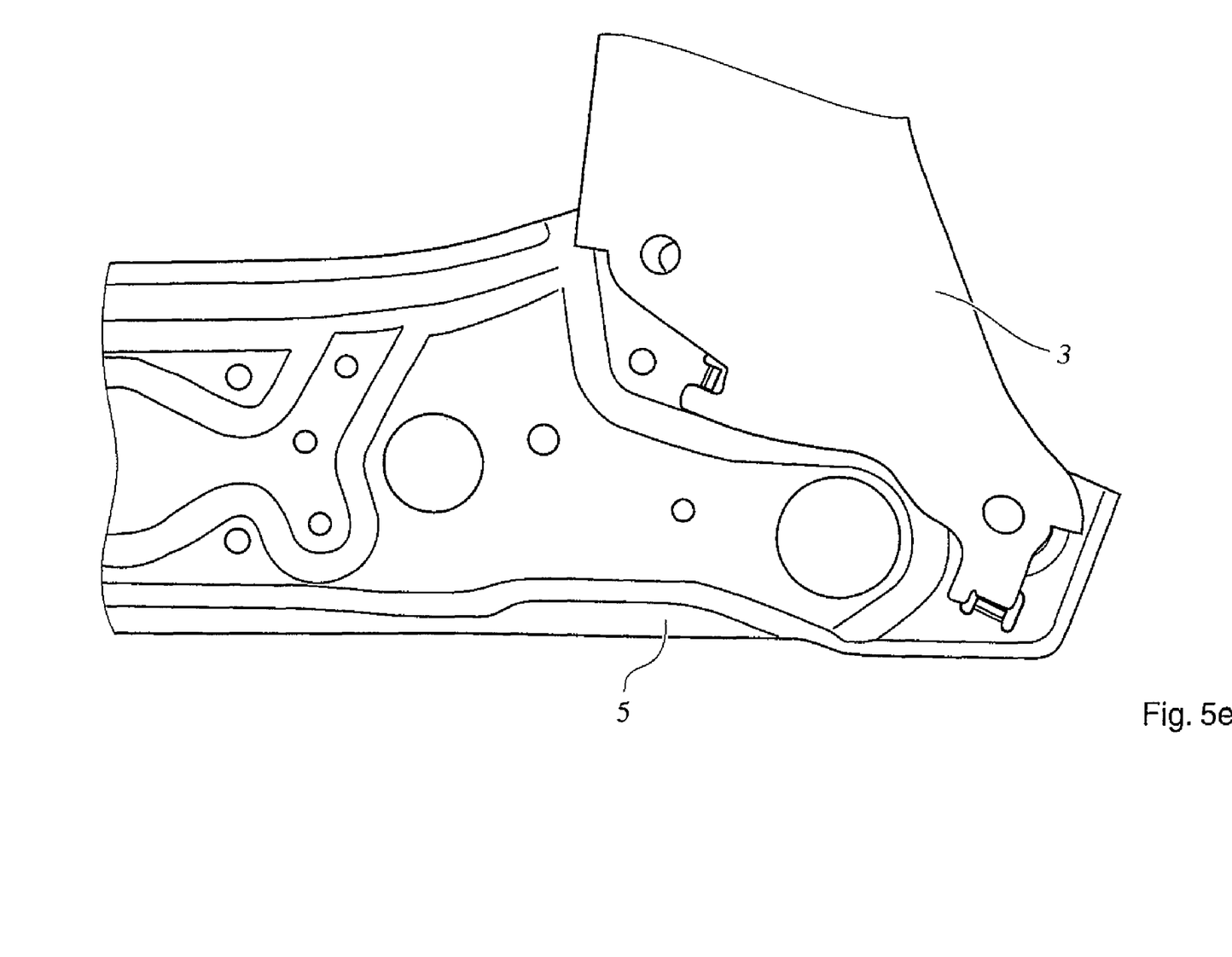
Figure 5F:
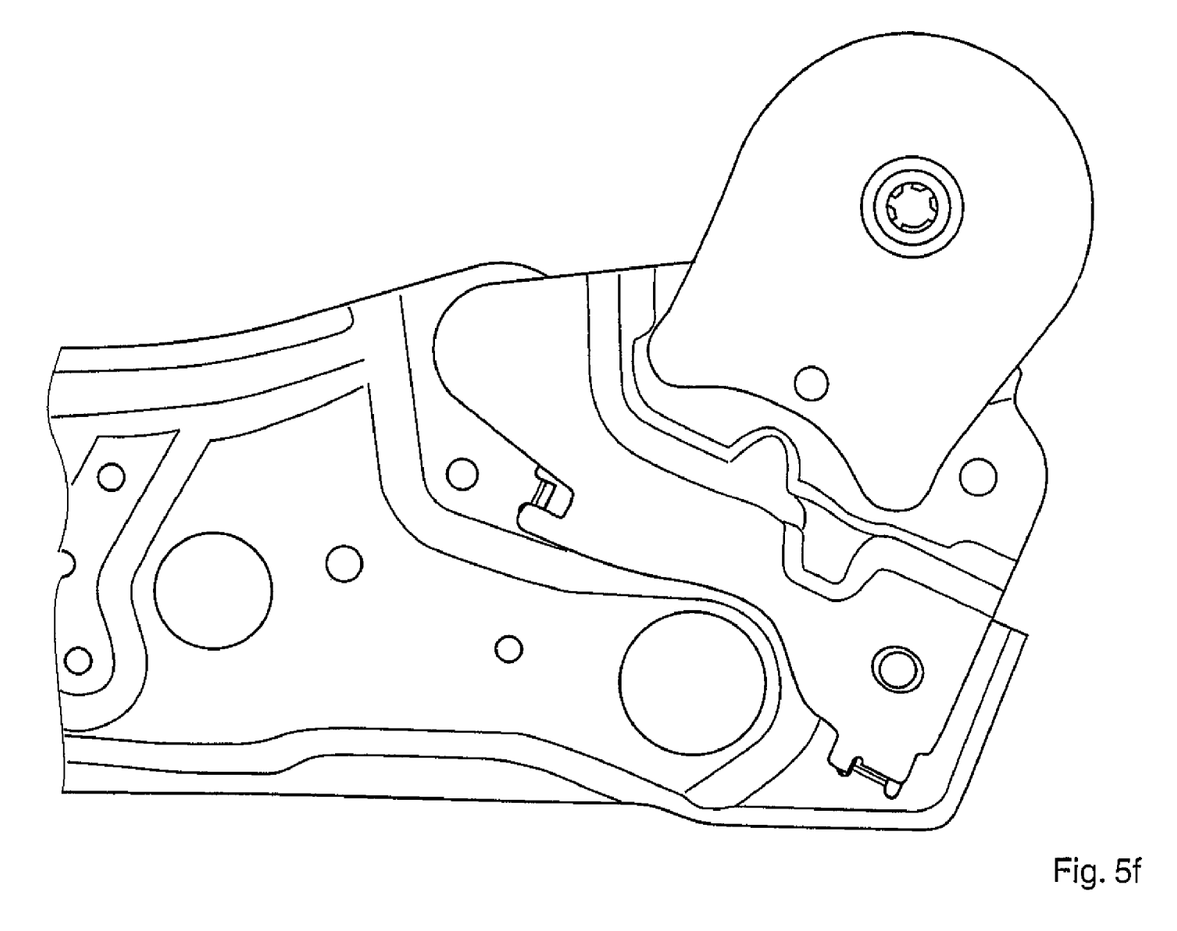

FIG. 4a shows the structure of the side parts of the sitting part 5 in a side view. In the view according to FIG. 4b, the fitting part 3 is already in the assembled position.

FIGS. 5a-5f show a further possibility for pre-positioning a fitting part 3 of a recliner (not shown) on the sitting part. In the present case, the backrest part 5 has two latching lugs 12', 12" which are notched out from the material of the backrest part, i.e. are integral therewith, and which are pushed out at the same time or subsequently, i.e. bent so that they are partially in front of or behind the part of the sitting part 5 surrounding said latching lugs. In the present case, the latching lugs run substantially parallel to the sitting part, forming a gap. A contour 13', 13" of the fitting 5 is at least partially inserted, fixed and clamped into this gap, so that it is pre-fixed and subsequently may be easily screwed by means of screws to the sitting part. The latching lugs cooperate in at least one, preferably in two, directions in a fixed manner in the contour of the fitting part.

The invention claimed is:

1. A vehicle seat comprising:
  a receiver configured to mount to a sitting part, wherein the receiver comprises a first bore having a concentric recess, and a stop longitudinally offset from the first bore;
  a fitting part configured to mount to a backrest, wherein the fitting part comprises a second bore having a cylindrical convexity, the second bore is configured to engage the first bore to block movement of the fitting part relative to the receiver, and the stop is configured to block rotation of the fitting part relative to the receiver via contact with the fitting part;
  a first fastener configured to engage the first bore and the second bore to secure the fitting part to the receiver; and
  a second fastener configured to engage a third bore of the receiver and a fourth bore of the fitting part to secure the fitting part to the receiver.

2. The vehicle seat of claim 1, wherein the stop is positioned rearward of the first bore to block rotation of the fitting part in a rearward direction.

3. A vehicle seat comprising:
  a receiver configured to mount to a sitting part, wherein the receiver comprises a first bore having a concentric recess, and a stop longitudinally offset from the first bore; and
  a fitting part configured to mount to a backrest, wherein the fitting part comprises a second bore having a cylindrical convexity;
  wherein the second bore is configured to engage the first bore to block movement of the fitting part relative to the receiver, and the stop is configured to block rotation of the fitting part relative to the receiver via contact with the fitting part;

wherein the fitting part is biased toward the receiver to urge the cylindrical convexity of the second bore into the concentric recess of the first bore.

4. The vehicle seat of claim 3, wherein the stop is positioned rearward of the first bore to block rotation of the fitting part in a rearward direction.

5. A vehicle seat comprising:
- a receiver configured to mount to a sitting part, wherein the receiver comprises a first bore having a concentric recess, and a stop longitudinally offset from the first bore;
- a fitting part configured to mount to a backrest, wherein the fitting part comprises a second bore having a cylindrical convexity, the second bore is configured to engage the first bore to block movement of the fitting part relative to the receiver, the fitting part is biased toward the receiver to urge the cylindrical convexity of the second bore into the concentric recess of the first bore, and the stop is configured to block rotation of the fitting part relative to the receiver via contact with the fitting part;
- a first fastener configured to engage the first bore and the second bore to secure the fitting part to the receiver; and
- a second fastener configured to engage a third bore of the receiver and a fourth bore of the fitting part to secure the fitting part to the receiver.

6. The vehicle seat of claim 5, wherein the stop is positioned rearward of the first bore to block rotation of the fitting part in a rearward direction.

\* \* \* \* \*